(12) United States Patent
Khaleel et al.

(10) Patent No.: US 12,384,732 B2
(45) Date of Patent: *Aug. 12, 2025

(54) FERTILIZERS CONTAINING CALCIUM SULFATE UREA AND METHODS FOR PRODUCING AND USING THE SAME

(71) Applicant: SABIC AGRI-NUTRIENTS COMPANY, Jubail (SA)

(72) Inventors: Mohamed Akasha M. Khaleel, Riyadh (SA); Andrew George Kells, Wilton (GB); Saleh Nafe Al Shammari, Riyadh (SA)

(73) Assignee: SABIC AGRI-NUTRIENTS COMPANY, Jubail (SA)

( * ) Notice: Subject to any disclaimer, the term of this patent is extended or adjusted under 35 U.S.C. 154(b) by 1034 days.

This patent is subject to a terminal disclaimer.

(21) Appl. No.: 17/299,406

(22) PCT Filed: Dec. 5, 2019

(86) PCT No.: PCT/IB2019/060479
§ 371 (c)(1),
(2) Date: Jun. 3, 2021

(87) PCT Pub. No.: WO2020/115698
PCT Pub. Date: Jun. 11, 2020

(65) Prior Publication Data
US 2022/0119320 A1 Apr. 21, 2022

Related U.S. Application Data

(60) Provisional application No. 62/776,557, filed on Dec. 7, 2018.

(51) Int. Cl.
*C05G 1/00* (2006.01)
*C05C 1/00* (2006.01)
(Continued)

(52) U.S. Cl.
CPC ............ *C05G 1/00* (2013.01); *C05C 1/00* (2013.01); *C05C 3/00* (2013.01); *C05C 9/00* (2013.01); *C05D 3/00* (2013.01); *C05D 9/02* (2013.01)

(58) Field of Classification Search
CPC .... C05G 1/00; C05C 1/00; C05C 3/00; C05C 9/00; C05D 3/00; C05D 9/02
See application file for complete search history.

(56) References Cited

U.S. PATENT DOCUMENTS

| 1,367,846 A | 2/1921 | Washburn |
| 2,074,880 A | 3/1937 | Whittaker et al. |

(Continued)

FOREIGN PATENT DOCUMENTS

| AU | 200118807 | 6/2001 |
| AU | 2012250293 | 12/2012 |

(Continued)

OTHER PUBLICATIONS

Achard, et al., "A new route for urea-superphosphate fertilizers," Phosphorus and Potassium, 1994, 191:27-33.

(Continued)

*Primary Examiner* — Wayne A Langel
(74) *Attorney, Agent, or Firm* — Norton Rose Fulbright US LLP

(57) ABSTRACT

A fertilizer composition containing a calcium sulfate urea (UCS) fertilizer and a urea free nitrogenous fertilizer and methods for making and using the same are disclosed. The calcium sulfate urea can be a calcium sulfate urea adduct. The urea free nitrogenous fertilizer can include one or more of ammonium sulfate urea and ammonium nitrate.

20 Claims, 3 Drawing Sheets

(51) Int. Cl.
*C05C 3/00* (2006.01)
*C05C 9/00* (2006.01)
*C05D 3/00* (2006.01)
*C05D 9/02* (2006.01)

(56) References Cited

U.S. PATENT DOCUMENTS

| | | | |
|---|---|---|---|
| 2,157,541 | A | 5/1939 | Hosokawa |
| 3,419,379 | A | 12/1968 | Goodale et al. |
| 3,925,053 | A | 12/1975 | Kealy |
| 3,935,298 | A | 1/1976 | Sugahara |
| 3,976,467 | A | 8/1976 | Seferian et al. |
| 4,019,889 | A | 4/1977 | Kealy |
| 4,175,943 | A * | 11/1979 | Jordaan ............... C05B 17/00 71/36 |
| 4,283,423 | A | 8/1981 | Watkins et al. |
| 4,352,688 | A * | 10/1982 | Ott ..................... C05C 3/00 71/11 |
| 4,478,632 | A | 10/1984 | Van Hijfte et al. |
| 4,507,139 | A | 3/1985 | Sullivan et al. |
| 5,264,017 | A | 11/1993 | Van de Walle |
| 5,409,516 | A | 4/1995 | Achard et al. |
| 5,716,591 | A | 2/1998 | Crispoldi |
| 5,917,110 | A | 6/1999 | Kust |
| 7,258,848 | B1 * | 8/2007 | Blackwell ............ C10L 3/102 423/313 |
| 11,299,441 | B2 * | 4/2022 | Kiiski ................. C05D 3/00 |
| 11,352,306 | B2 * | 6/2022 | Kells .................. C05G 5/30 |
| 11,802,096 | B2 * | 10/2023 | Kiiski ................. C05C 9/005 |
| 11,912,634 | B2 * | 2/2024 | Kells .................. C05G 5/30 |
| 2003/0073580 | A1 | 4/2003 | Runkis et al. |
| 2004/0031303 | A1 | 2/2004 | Whitehurst et al. |
| 2005/0144997 | A1 | 7/2005 | Phillips et al. |
| 2016/0075607 | A1 | 3/2016 | Aqel et al. |
| 2018/0297903 | A1 | 10/2018 | Ledoux et al. |
| 2020/0148607 | A1 | 5/2020 | Kiiski et al. |

FOREIGN PATENT DOCUMENTS

| | | | |
|---|---|---|---|
| CN | 1063095 | | 7/1992 |
| CN | 1463955 | | 12/2003 |
| CN | 101041603 | | 9/2007 |
| CN | 1894172 | | 10/2007 |
| CN | 101519324 | | 9/2009 |
| CN | 101798240 | | 8/2010 |
| CN | 102167650 | | 8/2011 |
| CN | 103086781 | | 5/2013 |
| CN | 103086810 | | 5/2013 |
| CN | 103819271 | | 5/2014 |
| CN | 104768901 | | 7/2015 |
| CN | 104803736 | | 7/2015 |
| CN | 106748017 | | 5/2017 |
| CN | 108349827 | | 7/2018 |
| CN | 108530175 | | 9/2018 |
| DE | 3816570 | | 11/1989 |
| DE | 29809124 | | 9/1999 |
| EP | 0988105 | | 3/2000 |
| EP | 2774907 | | 9/2014 |
| EP | 3210959 | | 8/2017 |
| EP | 3372576 | | 9/2018 |
| EP | 3374332 | | 9/2018 |
| EP | 3419953 | | 1/2019 |
| EP | 3436416 | | 2/2019 |
| EP | 3571174 | | 11/2019 |
| FR | 2676730 | | 11/1992 |
| FR | 2684372 | | 6/1993 |
| FR | 2745564 | | 9/1997 |
| GB | 492387 | | 9/1938 |
| GB | 624642 | | 6/1949 |
| GB | 822939 | | 11/1959 |
| GB | 921247 | | 3/1963 |
| GB | 1189398 | | 4/1970 |
| GB | 1211537 | A | 11/1970 |
| GB | 159854 | | 12/2021 |
| IL | 133429 | | 12/1999 |
| KR | 2003062520 | | 7/2003 |
| KR | 20100004615 | | 1/2010 |
| PL | 206964 | | 10/2010 |
| PL | 229915 | B1 | 9/2018 |
| RO | 111183 | | 7/1996 |
| SU | 1063800 | | 12/1983 |
| WO | WO 1998/055213 | | 12/1998 |
| WO | WO 2000/000452 | | 1/2000 |
| WO | WO 2001/021556 | | 3/2001 |
| WO | WO 2001/042172 | | 6/2001 |
| WO | WO 2004/000759 | | 12/2003 |
| WO | WO 2011/137393 | | 11/2011 |
| WO | WO-2016144640 A1 * | | 9/2016 ............... C05C 1/00 |
| WO | WO 2017/081183 | | 5/2017 |
| WO | WO 2018/162533 | | 9/2018 |
| WO | WO 2019/016761 | | 1/2019 |
| WO | WO 2019/016763 | | 1/2019 |
| WO | WO 2019/040427 | | 2/2019 |
| WO | WO 2019/215271 | | 11/2019 |
| WO | WO 2020/104916 | | 5/2020 |
| WO | WO 2020/115698 | | 6/2020 |

OTHER PUBLICATIONS

Akhavan-Kharazian et al., "Effects of CaSO4, CaCl2, and NaCl on leaf nitrogen, nodule weight, and acetylene reduction activity in Phaseolus vulgaris L.," Arid Soil Research and. Rehabilitation., 1991, 5(2):97-103.

Aldrich et al., "Gypsum and other sulfur materials for soil conditioning," California Agricultural Experiment Station Publications, 1951, Circular No. 403.

Alva et al., "Role of calcium in amelioration of copper phytotoxicity for citrus," Soil Science, 1993, 155:211-218.

Bayrakli "Ammonia volatilization losses from different fertilizers and effect of several urease inhibitors, CaCl2 and phosphogypsum on losses from urea," Fertilizer Research, 1990, 23(3):147-150.

Borowik et al., "Production technology of nitrogen-sulphur-calcium fertilizers on the base of urea and phosphogypsum," Chemik, 2012, 66(5):525-534.

Burt et al. "Flue-gas desulfurization gypsum effects on urea-degrading bacteria and ammonia volatilization from broiler litter." Poultry Science, 2017, 96(8):2676-2683.

De Villiers, et al. "Crystal structure of calcium sulfate-urea complex," Journal of Crystal and Molecular Structure, 1975; 5(4):215-226.

Dhiman, "Lecture 20 Single Superphosphate," Department of Chemical EngineeringIIT Roorkee, 2012, https://nptel.ac.in/courses/103/107/103107086/.

Epstein, "The essential role of calcium in selective cation transport by plant cells," Plant Physiology, 1961, 36(4):437-444.

Evangelou et al., "Mechanisms of "basic metals"—ammonia interactions: Field implications," Agronomy Abstracts, 1999, 199.

Fenn et al., "Calcium stimulation of ammonium absorption in onion," Agronomy Journal, 1991, 83:840-843.

Fenn et al., "Influence of plant age on calcium stimulated ammonium absorption by radish and onion." Journal of Plant Nutrition, 1993, 16(7):1161-1177.

Firsova, "Strength of Granules Based on Calcium Sulfate Crystal Solvates," Moscow University Chemistry Bulletin, 2010, 65(4):274-278.

Frame, et al. "In Vitro Evaluation of Coatings to Control Ammonia Volatilization from Surface-Applied Urea," Agronomy Journal, 2012, 104(5):1201. (Abstract Only).

Frazier et al., "Urea-monocalcium phosphate, a component of mixed fertilizers" *J. Agric. Food Chem.* 1967, 15(2), 345-347.

Hakeem, et al., "Reactive Nitrogen Inflows and Nitrogen use Efficiency in Agriculture: An Environment Perspective," Environmental Adaptions and Stress Tolerance of Plants in the Era of Climate Change, 2012, 10:217-232.

International Search Report and Written Opinion issued in Corresponding PCT Application No. PCT/IB2019/060479, dated Feb. 25, 2020.

(56) References Cited

OTHER PUBLICATIONS

International Search Report and Written Opinion issued in International Application No. PCT/IB2018/055397, dated Oct. 9, 2018.
International Search Report and Written Opinion issued in International Patent Application No. PCT/IB2018/055399, dated Oct. 12, 2018.
Jones, "Ammonia Volatilization: Process, Amounts, and Effects on Yield and Protein" Montana State University College of Agriculture & Montana Agricultural Experiment Station, Created for the Web, 2017.
Jones, et al., "Critical Ca Levels and Ca/Mg rations in *Trifolium subterraneum* L. grown on serpentine sofl-.," Agron. J., 1976, 68:756-759.
Khan et al., "Comparative effects of urea plus gypsum and urea plus ammonium sulphate on growth, yield and nutrition in canola cropping system in calcarosol of south-eastern Australia," Proceedings of the 5th Joint Australian and New Zealand Soil Science Conference: Soil solutions for diverse landscapes, 2012, 480.
Kirkby, "Maximizing calcium uptake by plants," Communications in Soil Science and Plant Analysis, 1979, 10(1-2):89-113.
Kotula, et al., "Czteromocznikan siarczanu wapnia-nawóz azotowo-siarkowo-wapniowy jako alter-natywa utylizacji fosfogipsu," Prace Naukowe Politechniki Szczecinskiej, 1998, 547, 91-96. (English Abstract Only).
Malinowski et al., "Preparation methods of calcium sulphate and urea adduct" *Polish Journal of Chemical Technology* 2007, 9(4), 111-114.
Muneer, et al., "The role of calcium-organic interactions in soil aggregate stability .III.. Mechanisms and models," Australian Journal of Soil Research., 1989, 27:411-423.
Oenema et al., "Ammonia volatilization from compound nitrogen-sulfur fertilizers." Optimization of Plant Nutrients, 1993:341-349.
Paroisse, "A new route for urea superphosphate fertilizers," Phosphorous and Potassium, 1994, 191, 27.
Podleśna, "Yielding Effect of Nitrogen and Sulfur At Pot Experiment Conditions With Winter Wheat," Ecological Chemistry and Engineering A, 2011, 18(3):401-405.
Prochnow et al., "Controlling ammonia losses during manure composting with the addition of phosphogypsum and simple superphosphate." Sci. agric. (Piracicaba, Brazil), 1995; 52(2):346-349.
Ridzwan et al., "Comparative performance of different urea coating materials for slow release" Particuology, 2014, 17:165-172.
Scott, et al., "Application of calcium to soil and cultivar affect elemental concentration of watermelon leaf and rind tissue," Journal of the American Society for Horticultural Science, 1993, 118(2):201-206.
Shainberg, et al., "Use of gypsum on soils: A review," Advances in Soil Science, 1989, 9:1.
Sharma et al. "Ammonia Volatilization as Influenced by Amendments in a Light Textured Alkali Soil" Annals of Arid Zone 33, 1991; 3:203-207.
Smyth, et al., "Aluminum and calcium constraints to continuous crop production in a Brazilian Amazon Oxisol.," Agronomy Journal, 1992, 84:843-850.
Vashishtha et al., "Improvement in Properties of urea by Phosphogypsum coating" *International Journal of ChemTech research* 2010, 2(1), 36-44.
Whittaker et al., "Reaction between Urea and Gypsum" *Ind. Eng. Chem.* 1933, 25(11), 1280-1282.
Zia et al., "Ammonia volatilization from nitrogen fertilizers with and without gypsum." Soil Use and Management, 1999, 15: 133-135.
Jing'an et al., *Production Process Technology.* $1^{st}$ ed., Chemical Industry Press, 2000 (English Translation of relevant parts provided).
Office Action and Search Report issued in Corresponding Chinese Application No. 202080078509.1, dated Oct. 21, 2022 (English translation provided).
Yunfeng et al., *New Food Processing Technology and Application.* $1^{st}$ ed., China Atomic Energy Press, 2018 (English Translation of relevant parts provided).
Office Action and Search Report issued in Corresponding Chinese Application No. 201980086833.5, dated Jan. 11, 2022 (English Translation provided).
Office Action issued in Corresponding Chinese Application No. 202080061008.2, dated Aug. 18, 2022 (English Translation provided).
Hearing Notice issued in corresponding Indian Application No. 202017005165, dated Mar. 7, 2023.
Biskupski et al., "Influence of different level of nitrogen fertilization on yielding and selected indices of canopy architecture in several spring wheat cultivars" Pamietnik Pulawski 2006, 142, 31-41.
Malinowski P., et al.: "Utilization of waste gypsum in fertilizer production." Polish Journal of Chemical Technology, 16, 1, 45-47, 10. (2014).
International Search Report and Written Opinion issued in Corresponding PCT Application No. PCT/IB2021/055807, dated Oct. 28, 2021.
Office Action issued in Corresponding Chinese Application No. 201880058201.3, dated Aug. 27, 2021 (English Translation provided).
Office Action issued in Corresponding Brazilian Application No. BR112020001068-5, dated May 18, 2022 (No English Translation provided).
"Role of sulfur in plant culture", *PT Growers and Consumers*, Jun. 3, 2014. Retrieved from the Internet: URL:https://www.pthorticulture.com/en-us/training-center/role-of-sulfur-in-plant-culture.
Buechel, T. "Role of calcium in plant culture", *PT Growers and Consumers*, Jun. 3, 2014. Retrieved from the Internet: <URL: https://www.pthorticulture.com/en-us/training-center/role-of-calcium-in-plant-culture>.
McKee, S., "Best methods for applying granular pant food", *Daves's Garden*, 2017. Retrieved from the Internet: <URL: https://davesgarden.com/guides/articles/best-methods-for-applying-granular-plant-food>.

\* cited by examiner

FERTILIZERS CONTAINING CALCIUM SULFATE UREA AND METHODS FOR PRODUCING AND USING THE SAME

CROSS REFERENCE TO RELATED APPLICATIONS

This application is a national phase application under 35 U.S.C. § 371 of International Application No. PCT/IB2019/060479, filed Dec. 5, 2019, which claims priority to and the benefit of U.S. Provisional Application No. 62/776,557, filed Dec. 7, 2018, the entire contents of each of which are incorporated into the present application in their entirety.

BACKGROUND OF THE INVENTION

A. Field of the Invention

The invention generally concerns a fertilizer composition containing a calcium sulfate urea adduct and a urea free nitrogenous fertilizer and methods of making and using the same.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients. Single-nutrient fertilizers and multi-nutrient fertilizers, such as fertilizer blends, have been developed to meet the varied needs of crop production worldwide.

Mixing of fertilizer ingredients (e.g., urea, potassium compounds, calcium compounds, phosphorous compounds, etc.) can result in the production of fertilizers having a large number of ratios of primary nutrient contents. However, bulk blending is only a practical proposition as long as the fertilizer materials are stable when in contact with each other in the blended fertilizer. Urea ($CH_4N_2O$) is a compound that contains nitrogen and is widely used as a nitrogen source in fertilizers; however, urea undesirably reacts with compounds such as hydrates of calcium phosphate and sulfate and organic fertilizers. These reactions can produce water that liquefies solid granules or dry mixture products, which causes clumping and loss of product and increases the rate at which these undesirable reactions take place. See Biskupski et al. (EP 2,774,907); see also Achard et al. (U.S. Pat. No. 5,409,516). Further, the production of water increases the amount of water that has to be removed during production of urea containing fertilizers, making these blended fertilizers more difficult and expensive to make. See Schwob (FR 2,684,372). Also, rapid hydrolysis and nitrification of urea in the soil can cause loss of nitrogen from urea.

Attempts to reduce or overcome some of the problems with using urea in fertilizers have been attempted by binding urea in adducts, such as adducts with calcium nitrate, calcium chloride, or calcium sulfate (see U.S. Pat. Nos. 5,716,591; 5,917,110; 4,507,139; and 3,976,467). For example, calcium sulfate urea adduct (UCS) can be used as a more stable nitrogen, sulfur, and calcium source for plants. There are several methods for producing UCS adducts. Biskupski et al. teaches production in a continuous process by reacting a urea-sulfuric acid solution with phosphate rock. Achard et al. discloses the production of UCS in producing phospho-nitrogenous products by reacting a sulfo-urea reagent with calcium phosphate. Polish Patent 206,964 teaches production by reacting urea with calcium sulfate.

However, UCS does not provide the ideal amount of nutrients for all plants, regions, or soils. Thus, there is a continued need to produce UCS blends with various amounts of nutrients and trace elements to address the specific needs of plants, regions, and soils.

SUMMARY OF THE INVENTION

A discovery has been made that addresses at least some of the needs for combinations of plant nutrients in a single fertilizer or single fertilizer blend. The discovery is premised on using a UCS-based fertilizer that either incorporates additional compounds into the adduct or contains additional nutrient compounds in a blended or compounded fertilizer. For example, UCS can be formed in the presence of or can be combined with a urea free nitrogenous fertilizer such as ammonium sulfate and/or ammonium nitrate to form the UCS-based fertilizer of the present invention. These UCS-based fertilizer combinations or products can contain 20 wt. % to 30 wt. % elemental nitrogen, 5 wt. % to 15 wt. % elemental calcium, and 5 wt. % to 15 wt. % elemental sulfur. The UCS-based fertilizer can, in some instances, supply nitrogen in two or more of uric ($NH_2$), ammoniacal ($NH_3$), and nitrate ($NO_3$) forms. Further, trace elements can also be combined in the UCS-based fertilizer, such as Fe, Mn, Zn, and/or Cu. The UCS-based fertilizer can be beneficial to provide the desired nutrients in a single application.

In one aspect of the invention, a UCS-based fertilizer is described. The UCS-based fertilizer can include a UCS adduct and a urea free nitrogenous fertilizer. The UCS adduct can be, but is not limited to, $CaSO_4 \cdot 4CO(NH_2)_2$. Up to 100 wt. % of the urea in the fertilizer can be comprised in the UCS adduct. Alternatively, at least 50 wt. % of the urea in the fertilizer can be comprised in the UCS adduct. In some instances, the urea free nitrogenous fertilizer is one or both of ammonium sulfate and ammonium nitrate. In some instances, the urea free nitrogenous fertilizer is not ammonium sulfate and/or ammonium nitrate. The urea free nitrogenous fertilizer concentration in the UCS-based fertilizer can, in some instances, be at a weight ratio of 1:6 to 1:2, or any ratio therein, as compared to the total amount of urea (bound in the adduct or unbound) in the UCS-based fertilizer. In some instances, the UCS-based fertilizer does not contain a phosphate-based fertilizer, a urea-based fertilizer other than urea present in the UCS adduct, and/or a potassium-based fertilizer.

In some embodiments, the UCS-based fertilizer can include 20 wt. % to 30 wt. % elemental nitrogen, 5 wt. % to 15 wt. % elemental calcium, and 5 wt. % to 15 wt. % elemental sulfur. In some instances, the UCS-based fertilizer can include 22 wt. % to 27 wt. % elemental nitrogen, 8 wt. % to 12 wt. % elemental calcium, and 5 wt. % to 12 wt. % elemental sulfur. In some instances, the UCS-based fertilizer can include 23 wt. % to 26 wt. % elemental nitrogen, 9 wt. % to 11 wt. % elemental calcium, and 6 wt. % to 11 wt. % elemental sulfur. The UCS-based fertilizer can include 24 wt. % to 25 wt. % elemental nitrogen, 10 wt. % elemental calcium, and 7 wt. % to 10 wt. % elemental sulfur. In one instance, the UCS-based fertilizer can include 24 wt. % elemental nitrogen, 10 wt. % elemental calcium, and 10 wt. % elemental sulfur. In some instances, the UCS-based fertilizer contains UCS adduct and ammonium sulfate and no ammonium nitrate. In one instance, the UCS-based fertilizer can include 25 wt. % elemental nitrogen, 10 wt. % elemental calcium, and 7 wt. % elemental sulfur. In some instances, the UCS-based fertilizer contains UCS adduct and ammonium nitrate and no ammonium sulfate.

In some aspects, the UCS-based fertilizer can contain nitrogen in two or more of the uric form ($NH_2$), ammoniacal form ($NH_3$), and nitrate form ($NO_3$). The UCS-based fertilizer can contain 15 wt. % to 25 wt. % nitrogen in the uric form based on the weight of the UCS-based fertilizer. In some instances, the UCS-based fertilizer contains 18 wt. % to 23 wt. % nitrogen in the uric form based on the weight of the UCS-based fertilizer. In some instances, the UCS-based fertilizer contains 20 wt. % to 21 wt. % nitrogen in the uric form based on the weight of the UCS-based fertilizer. The UCS-based fertilizer can contain 1 wt. % to 5 wt. % elemental nitrogen in ammoniacal form based on the weight of the UCS-based fertilizer. In some instances, the UCS-based fertilizer contains 2 wt. % to 3 wt. % elemental nitrogen in ammoniacal form based on the weight of the UCS-based fertilizer. The UCS-based fertilizer can contain 2 wt. % to 7 wt. % elemental nitrogen in nitrate form based on the weight of the UCS-based fertilizer. In some instances, the UCS-based fertilizer contains 4 wt. % to 5 wt. % elemental nitrogen in nitrate form based on the weight of the UCS-based fertilizer.

In some aspects, the UCS-based fertilizer can contain particles of the UCS adduct and particles of the urea free nitrogenous fertilizer. The particles can be elongated particles or can be substantially spherical particles or other shapes or combinations of such shapes. In some instances, the UCS adduct particles are of a different size and/or shape than the urea free nitrogenous fertilizer particles.

The free moisture content of the UCS-based fertilizer can be less than 1 wt. %, less than 0.8 wt. %, less than 0.5 wt. %, or 0.25 wt. % to 0.7 wt. % water. The UCS-based fertilizer can have a density greater than water (e.g., greater than 1.0 g/mL).

The UCS-based fertilizer can be a granule. In some instances, the granule can have an average particle size of 1 millimeter (mm) to 5 mm, preferable about 2 mm to 4 mm. The UCS-based fertilizer can include one or more particles. The particles can include a core and one or more layers covering at least a portion of the core. A first portion of the particles can be the UCS adduct and/or the UCS-based fertilizer, and a second portion of the particles can form the layer that covers at least a portion of the UCS adduct and/or the UCS-based fertilizer. The layer can self-assemble during the manufacture of the UCS-based fertilizer. The layer can be made up of particles of urea, particles of calcium sulfate, particles of urea free nitrogenous fertilizer, and/or particles of UCS adduct, or any combination or all thereof.

The UCS-based fertilizer can be a granule having a crush strength of 1 N/granule to 50 N/granule, preferably 9 N/granule to 45 N/granule. The UCS-based fertilizer of the present invention can be acidic.

The UCS-based fertilizer of the present invention can also contain one or more additives. The UCS-based fertilizer can contain additional nutrients or micronutrients. In some instances, the UCS-based fertilizer can contain one or more of iron, manganese, zinc, and copper. In some instances, the UCS-based fertilizer contains MgO. In some instances, the UCS-based fertilizer can contain 0.1 wt. % to 5 wt. %, 1.5 wt. % to 4 wt. %, or 2 wt. % to 4 wt. % MgO. The UCS-based fertilizer can contain a phosphate-based fertilizer, an additional urea-based fertilizer, and/or a potassium-based fertilizer. In some instances, the UCS-based fertilizer does not include phosphorus, potassium, or both. The additive can be a fertilizer, a micronutrient, a secondary nutrient, or an organic additive. The additive can be a fertilizer, compound, or composition that provides a nitrogen based fertilizer, a phosphate-based fertilizer, a potassium-based fertilizer, a urea-based fertilizer, a fertilizer providing nitrogen-phosphorus-potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, phosphate rocks, potash, sulfate of potash (SOP), muriate of potash (MOP), kieserite, carnallite, magnesite, dolomite, boric acid, boron (B), copper (Cu), iron (Fe), manganese (Mn), molybdenum (Mo), zinc (Zn), selenium (Se), silicon (Si), free Ca, magnesium (Mg), elemental sulfur (S), neem oil, seaweed extract, bio-stimulants, char, ashes from incineration of animal waste or animal tissues, or any combination thereof.

In yet another aspect of the invention, processes to produce the UCS-based fertilizer of the present invention are described. A process can include forming and/or obtaining UCS and combining the formed and/or obtained UCS with a urea free nitrogenous fertilizer. A process can additionally or alternatively include forming a UCS from a mixture containing urea, $CaSO_4$, water, and optionally a urea free nitrogenous fertilizer. In some instances, the urea free nitrogenous fertilizer is one or both of ammonium sulfate and ammonium nitrate. In some instances, the urea free nitrogenous fertilizer is not ammonium sulfate and/or is not ammonium nitrate. The urea free nitrogenous fertilizer concentration in the UCS-based fertilizer can, in some instances, be at a weight ratio of 1:6 to 1:2, or any ratio therein, as compared to the total amount of urea in the UCS-based fertilizer (bound in the adduct or unbound). The process can further include combining additional plant nutrients when the UCS and urea free nitrogenous fertilizer are combined and/or combining additional plant nutrients with the mixture containing urea, $CaSO_4$, water, and optionally a urea free nitrogenous fertilizer used to form UCS. The additional plant nutrients can include nutrients that are or contain Fe, Mn, Zn, and/or Cu. In some instances, no acid is added to form the UCS.

In some instances, the UCS can be formed by any means known. In some instances, forming the UCS includes reacting urea and $CaSO_4$ to form the adduct. The UCS can be formed in the presence or absence of one or more urea free nitrogenous fertilizer. In some instances, forming the UCS can be performed at a temperature of 60° C. to 115° C., 80° C. to 115° C., or 80° C. to 90° C., or any range therein. Forming the UCS can include reacting urea and $CaSO_4$ at a weight ratio of 2:1 to 1:2, or any ratio therein.

The UCS-based fertilizer can be dried in some instances to form a solid fertilizer composition. The solid fertilizer composition can be a granule, powder, pellet, etc.

In another aspect of the present invention, methods of fertilizing are described. A method can include applying the UCS-based fertilizer of the present invention to a portion of a soil, a crop, or a combination of the soil and the crop. In some embodiments, the soil is at least partially or fully submerged under water (e.g., rice paddy crops) and the UCS-based fertilizer sinks in the water to contact the soil. This can allow for homogenous distribution of the UCS-based fertilizer to the soil rather than having the UCS-based fertilizer coalesce together in or on the surface of the water.

Also disclosed in the context of the present invention are blended or compounded fertilizer compositions that include a plurality of UCS granules mixed with one or more urea free nitrogenous fertilizer, such as ammonium sulfate and/or ammonium nitrate, to form a UCS-based fertilizer of the present invention. Optionally other fertilizers, micronutrients, secondary nutrients, or organic additives can also be included in the blended or compounded fertilizer. The fertilizers can be particulate in form (e.g., urea, monoammonium phosphate (MAP), diammonium phosphate (DAP), muriate of potash (MOP), and/or sulfate of potash (SOP)). Preferably, the UCS-based fertilizer and additional fertilizers are compatible with each other (e.g., can contact each other without having a chemical reaction take place). The blended or compounded fertilizer can contain in addition to the UCS-based fertilizer or can exclude, a nitrogen based fertilizer, a phosphate-based fertilizer, a potassium-based fertilizer, a urea-based fertilizer, a fertilizer providing nitrogen, phosphorus, and potassium (NPK), diammonium phosphate (DAP), monoammonium phosphate (MAP), single superphosphate (SSP), triple superphosphate (TSP), urea, potassium chloride, potassium sulfate, magnesium sulfate, superphosphates, phosphate rocks, potash, sulfate of potash (SOP), muriate of potash (MOP), kieserite, carnallite, magnesite, dolomite, boric acid, B, Cu, Fe, Mn, Mo, Zn, Se, Si, Ca, Mg, S, neem oil, seaweed extract, bio-stimulants, char, ashes from incineration of animal waste or animal tissues, etc., or any combination thereof.

Also disclosed are the following Aspects 1 to 20 of the present invention.

Aspect 1 is a fertilizer composition comprising a calcium sulfate urea adduct and a urea free nitrogenous fertilizer.

Aspect 2 is the fertilizer composition of Aspect 1, wherein the urea free nitrogenous fertilizer comprises ammonium sulfate.

Aspect 3 is the fertilizer composition of any one of Aspects 1 to 2, wherein the urea free nitrogenous fertilizer comprises ammonium nitrate.

Aspect 4 is the fertilizer composition of any one of Aspects 1 to 3, comprising 20 wt. % to 30 wt. % elemental nitrogen, 5 wt. % to 15 wt. % elemental calcium, and 5 wt. % to 15 wt. % elemental sulfur.

Aspect 5 is the fertilizer composition of any one of Aspects 1 to 4, comprising 22 wt. % to 27 wt. % elemental nitrogen, 8 wt. % to 12 wt. % elemental calcium, and 5 wt. % to 12 wt. % elemental sulfur.

Aspect 6 is the fertilizer composition of any one of Aspects 1 to 5, further comprising one or more of iron, manganese, zinc, and copper.

Aspect 7 is the fertilizer composition of any one of Aspects 1 to 6, comprising particles of the calcium sulfate urea adduct and particles of the urea free nitrogenous fertilizer.

Aspect 8 is the fertilizer composition of any one of Aspects 1 to 7, comprising 15 wt. % to 25 wt. % elemental nitrogen in uric form (NH2).

Aspect 9 is the fertilizer composition of any one of Aspects 1 to 8, comprising either 1 wt. % to 5 wt. % elemental nitrogen in ammoniacal form (NH3), or 2 wt. % to 7 wt. % elemental nitrogen in nitrate form (NO3), or a combination thereof.

Aspect 10 is the fertilizer composition of any one of Aspects 1 to 9, wherein the composition is a fertilizer blend or a compounded fertilizer.

Aspect 11 is the fertilizer composition of any one of Aspects 1 to 10, further comprising a phosphate-based fertilizer, a urea-based fertilizer, or a potassium-based fertilizer.

Aspect 12 is the fertilizer composition of any one of Aspects 1 to 11, further comprising a micronutrient, a secondary nutrient, an organic additive, or any combination thereof.

Aspect 13 is a method of making the fertilizer composition of any one of Aspects 1 to 12, the method comprising: (a) forming and/or obtaining a calcium sulfate urea adduct and combining the formed and/or obtained adduct with a urea free nitrogenous fertilizer to obtain the fertilizer composition of any one of Aspects 1 to 12; or (b) forming a calcium sulfate urea adduct from a mixture comprising urea, CaSO4, water, and a urea free nitrogenous fertilizer to obtain the fertilizer composition of any one of Aspects 1 to 12.

Aspect 14 is the method of Aspect 13, wherein the urea free nitrogenous fertilizer comprises ammonium sulfate.

Aspect 15 is the method of any one of Aspects 13 to 14, wherein the urea free nitrogenous fertilizer comprises ammonium nitrate.

Aspect 16 is the method of any one of Aspects 13 to 15, wherein forming the calcium sulfate urea adduct comprises reacting urea and CaSO4 to form the adduct.

Aspect 17 is the method of Aspect 16, wherein the reaction is performed at a temperature of 60° C. to 115° C.

Aspect 18 is the method of any one of Aspects 16 to 17, comprising reacting urea and CaSO4 at a weight ratio of 2:1 to 1:2, and wherein the urea free nitrogenous fertilizer is present in the fertilizer composition at a weight ratio of 1:6 to 1:2 as compared to the total amount of urea in the fertilizer bound in the calcium sulfate urea adduct and unbound.

Aspect 19 is the method of any one of Aspects 13 to 18, wherein the fertilizer composition is dried to form a solid fertilizer composition.

Aspect 20 is a method of fertilizing, the method comprising applying the fertilizer composition of any one of Aspects 1 to 12 to a portion of a soil, a crop, or the soil and the crop.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to bio-stimulants, urease inhibitors, and nitrification inhibitors. In some particular instances, the fertilizer is UCS, urea, or a urea free nitrogenous fertilizer.

The term "urea free nitrogenous fertilizer" is defined as a material that does not contain urea and that is capable of providing nitrogen to a plant or soil. Non-limiting examples of a urea free nitrogenous fertilizer include ammonium sulfate and ammonium nitrate.

The term "micronutrient" is defined as a chemical element or substance required in trace amounts for the normal growth and development of a plant. Non-limiting examples of micronutrients include B, Cu, Fe, Mn, Mo, Zn, Se, and Si or compounds thereof.

The term "secondary nutrient" is defined as a chemical element or substance required in moderate amounts for plant growth and are less likely to limit crop growth in comparison to N, P, and K. Non-limiting examples of secondary nutrients include Ca, Mg, and S or combinations thereof.

The term "organic agent" is defined as a substance that is produced by or part of an organism. Non-limiting examples of organic agents suitable for a fertilizer include neem oil, seaweed extract, bio-stimulants, char, ashes from incineration of animal waste or animal tissues, and diatomaceous earth.

The term "granule" can include a solid material. A granule can have a variety of different shapes, non-limiting examples of which include a spherical, a puck, an oval, a rod, an oblong, or an amorphous shape.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams total of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "free moisture content," as the term used in this specification and/or claims means the water or moisture not associated with calcium sulfate dihydrate or hemihydrate. This term means any other free water or moisture.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The UCS-based fertilizers of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the UCS-based fertilizers of the present invention is the presence of a stable UCS adduct and a urea free nitrogenous fertilizer, such as ammonium sulfate and/or ammonium nitrate, or the presence of a reactant product of reacting urea, $CaSO_4$, water, and the urea free nitrogenous fertilizer to form at least one adduct.

BRIEF DESCRIPTION OF THE DRAWINGS

Advantages of the present invention may become apparent to those skilled in the art with the benefit of the following detailed description and upon reference to the accompanying drawings.

Figure 1A:
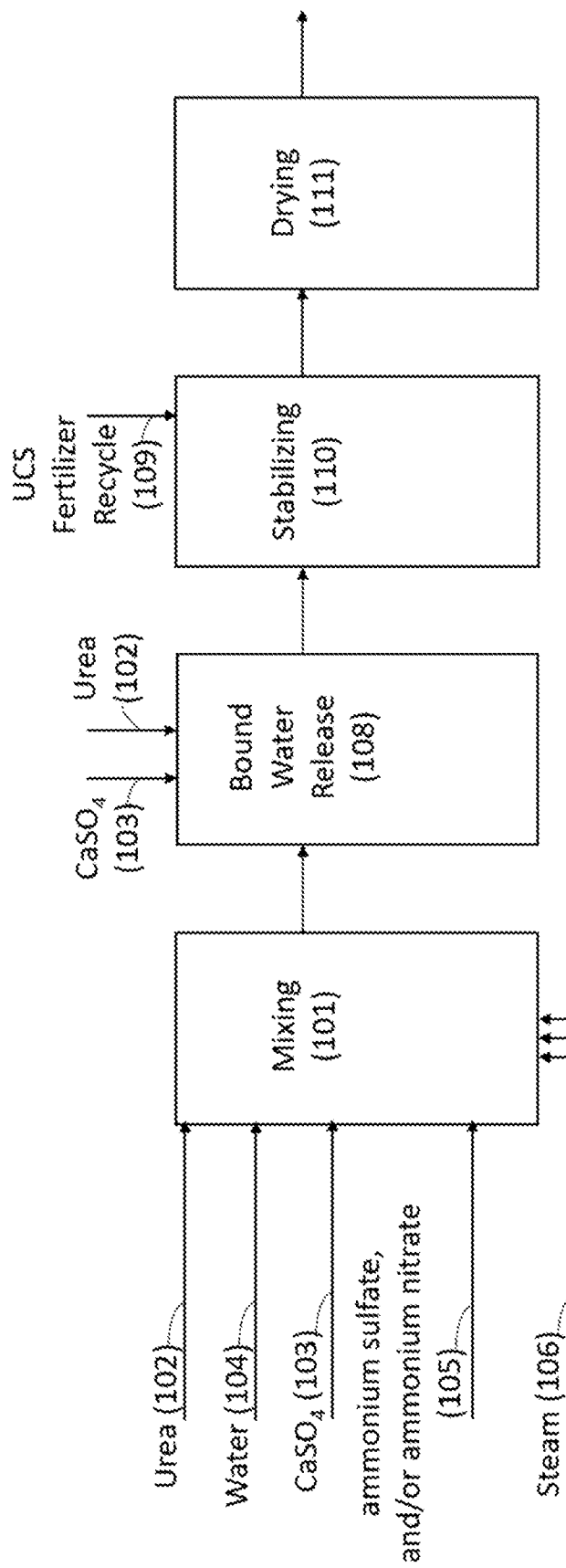
FIGS. 1A-1C are: 1A a schematic of a system that can be used to produce a UCS-based fertilizer of the present invention in which solid urea can be used as a starting material; 1B a schematic of a system that can be used where urea solution, urea free nitrogenous fertilizer (exemplified by ammonium sulfate and/or ammonium nitrate solution) solution or slurry, urea melt, or a calcium sulfate slurry can be used as reactant materials; and 1C a schematic of a system that can be used to produce a blended UCS-based fertilizer.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides for UCS-based fertilizers that can be designed to provide the ideal amount of nutrients for all plants, regions, or soils. Thus, the UCS-based fertilizers of the present invention can be tuned/modified to address the specific needs of plants, regions, and/or soils across the globe. Notably, the fertilizers are storage stable. For example the fertilizers can reduce or avoid instances of the formation of water produced during storage by unwanted chemical reactions within the fertilizers and/or fertilizer blends of the present invention.

These and other non-limiting aspects of the present invention are discussed in further detail in the following sections.

A. UCS-Based Fertilizers

The UCS-based fertilizers of the present invention can incorporate urea free nitrogenous fertilizer(s) into the UCS adduct or can be a combination of urea free nitrogenous fertilizer(s) and UCS in a blended fertilizer. In some instances, UCS can be formed in the presence of urea free nitrogenous fertilizer to produce the UCS-based fertilizers of the present invention. In some instances, urea free nitrogenous fertilizer are combined in a blended fertilizer with UCS. These combinations or products can contain 20 wt. % to 30 wt. % elemental nitrogen, 5 wt. % to 15 wt. % elemental calcium, and 5 wt. % to 15 wt. % elemental sulfur. These combinations or products can, in some instances, supply nitrogen in two or more of uric ($NH_2$), ammoniacal ($NH_3$), and nitrate ($NO_3$) forms. Further, trace elements can also be combined in the fertilizer, such as Fe, Mn, Zn, and/or Cu. These fertilizers and fertilizer blends can be beneficial to provide the desired nutrients in a single application.

The UCS of the present invention can include UCS formed from the following non-limiting reaction:

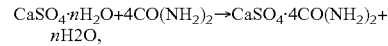

$$CaSO_4 \cdot nH_2O + 4CO(NH_2)_2 \rightarrow CaSO_4 \cdot 4CO(NH_2)_2 + nH_2O,$$

where n is a value from 0 to 2 (e.g., 0, 0.5, 1, 2).

The UCS of the UCS-based fertilizers can be produced by forming UCS in the presence of urea free nitrogenous fertilizer(s), such as ammonium sulfate and/or ammonium nitrate. In some instances, no acid is added to form the UCS-based fertilizer of the present invention.

The UCS-based fertilizers are stable and can contain elemental nitrogen at concentrations between 20 wt. % to 30 wt. % (e.g., 21 wt. %, 22 wt. %, 23 wt. %, 24 wt. %, 25 wt. %, 26 wt. %, 27 wt. %, 28 wt. %, 29 wt. %, or 30 wt. %), elemental calcium at concentrations between 5 wt. % to 15 wt. % (e.g., 5 wt. %, 6 wt. %, 7 wt. %, 8 wt. %, 9 wt. %, 10 wt. %, 11 wt. %, 12 wt. %, 13 wt. %, 14 wt. %, or 15 wt. %), and elemental sulfur at concentrations between 5 wt. % to 15 wt. % (e.g., 5 wt. %, 6 wt. %, 7 wt. %, 8 wt. %, 9 wt. %, 10 wt. %, 11 wt. %, 12 wt. %, 13 wt. %, 14 wt. %, or 15 wt. %). The UCS-based fertilizers can include 22 wt. % to 27 wt. % elemental nitrogen, 8 wt. % to 12 wt. % elemental calcium, and 5 wt. % to 12 wt. % elemental sulfur. UCS-based fertilizers of the present invention can include 23 wt. % to 26 wt. % elemental nitrogen, 9 wt. % to 11 wt. % elemental calcium, and 6 wt. % to 11 wt. % elemental sulfur. In one instance, a UCS-based fertilizer can include 24 wt. % elemental nitrogen, 10 wt. % elemental calcium, and 10 wt. % elemental sulfur. In some instances, this UCS-based fertilizer includes ammonium sulfate. In one instance, a UCS-based fertilizer can include 25 wt. % elemental nitrogen, 10 wt. % elemental calcium, and 7 wt. % elemental sulfur. In some instances, this UCS-based fertilizer includes ammonium nitrate. In some instances, the UCS-based fertilizer does not include phosphorus, potassium, or both. In some instances, the UCS-based fertilizer can be a 24-0-0-based fertilizer or a 25-0-0-based fertilizer. This can be beneficial where higher concentrations of nitrogen are desired in a stable fertilizer. These fertilizers can also beneficially reduce the amount of material needed to provide nitrogen in a stable fertilizer.

The UCS-based fertilizer produced can also contain low amounts of moisture. The free moisture content of the UCS-based fertilizer can be less than 1 wt. %, preferably less than 0.8 wt. %, less than 0.5 wt. %, or 0.25 wt. % to 0.7 wt. % water. In some instances, the free moisture content is 1, 0.9, 0.8, 0.7, 0.6, 0.5, 0.4, 0.3, 0.2, 0.1, or 0 wt. %.

In some instances, the surface of a UCS-based fertilizer can include a layer having urea, calcium sulfate, urea free nitrogenous fertilizer such as ammonium sulfate and/or ammonium nitrate, or UCS, or any combination thereof or all thereof. By way of non-limiting examples, the layer can be formed on at least a portion of the outer surface of a UCS-based fertilizer granule, and the layer can include at least: (1) urea; (2) calcium sulfate; (3) UCS; (4) ammonium sulfate; (5) ammonium nitrate; (6) urea and calcium sulfate; (7) urea and UCS; (8) urea and ammonium sulfate; (9) urea and ammonium nitrate; (10) calcium sulfate and UCS; (11) calcium sulfate and ammonium sulfate; (12) calcium sulfate and ammonium nitrate, (13) UCS and ammonium sulfate; (14) UCS and ammonium nitrate; (15) ammonium nitrate and ammonium sulfate; (16) urea, calcium sulfate, and UCS; (17) urea, calcium sulfate, and ammonium sulfate; (18) urea, calcium sulfate, and ammonium nitrate; (19) urea, UCS, and ammonium sulfate; (20) urea, UCS, and ammonium nitrate; etc. The layer can self-form or self-assemble during the production process of the UCS-based fertilizer. The urea, calcium sulfate, UCS adduct, and urea free nitrogenous fertilizer in the layer can be in particulate form. Also, and without wishing to be bound by theory, it is believed that the layer self-assembles during the manufacture of UCS-based fertilizer granules, which provides an additional benefit of reducing the costs and complexities of forming coatings on fertilizer granules using traditional processes such as spray coating, dip coating, etc.

The UCS-based fertilizer can be comprised of one or more particles. A first portion of the particles can be the UCS, and a second portion of the particles can form a layer that covers at least a portion of the UCS. In certain non-limiting aspects, the first portion of the particles can have an average particle size of 1, 2, 3, 4, 5, 6, 7, 8, 9, 10, 11, 12, 13, 14, or 15 micrometers, and the second portion of the particles can have an average particle size of 15, 20, 30, 40, 50, 60, 70, 80, 90, 100, 200, 300, 400, 500, 600, 700, 800, or 900 micrometers or any size there between. The layer can be made up of particles of urea, particles of calcium sulfate, particles of UCS, particles of urea free nitrogenous fertilizer, or any combination, or all thereof. In some embodiments, the smaller and larger particles can be elongated particles or can be substantially spherical particles or other shapes, or combinations of such shapes. Non-limiting examples of shapes include a spherical, a puck, an oval, a rod, an oblong, or a random shape.

The UCS-based fertilizer can be a granule and can have a crush strength of 1, 2, 3, 4, 5, 6, 7, 8, 9, 10 kg/granule, or more, or any amount there between, preferably 2 kg/granule to 5 kg/granule.

An additional non-limiting benefit of the UCS-based fertilizer of the present invention is that it can be a good acidifier, which can contribute to efficient nutrient distribution to the soil and/or plants. Even further, the UCS-based fertilizer can increase nutrient uptake by the plants due, at least in part, to the acidic feature. In some particular aspects, the UCS-based fertilizer can have a pH of 3, 3.5, 4, 4.5, 5, 5.5, or 6, preferably 4 to 5 when mixed with water. In some instances, no acid is added to form the UCS of the UCS-based fertilizer or to form the UCS-based fertilizer of the present invention. Also, the UCS-based fertilizer of the present invention can have an average size of 1, 1.5, 2, 2.5, 3, 3.5, 4, 4.5, or 5 mm, preferably about 2 mm to 4 mm. It is also believed that the contents and/or structure of the UCS-based fertilizer of the present invention can aid in reducing nitrogen volatilization.

B. Process to Produce UCS-Based Fertilizers

Figure 1B:
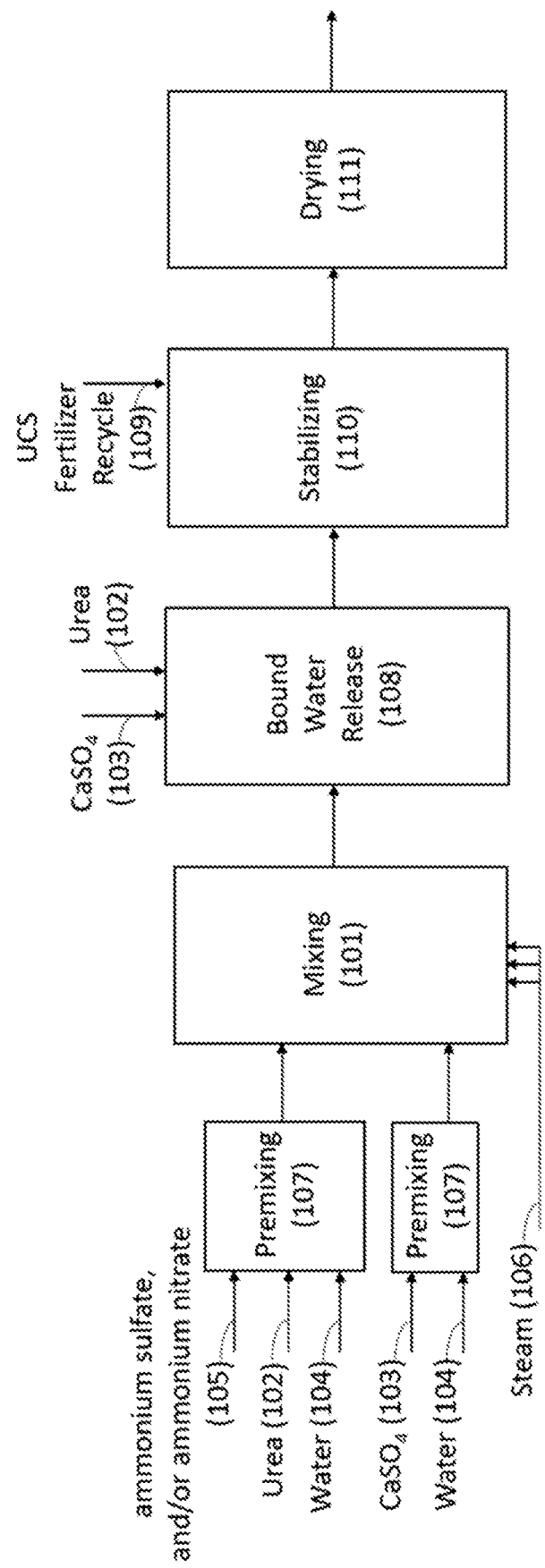
Figure 1C:
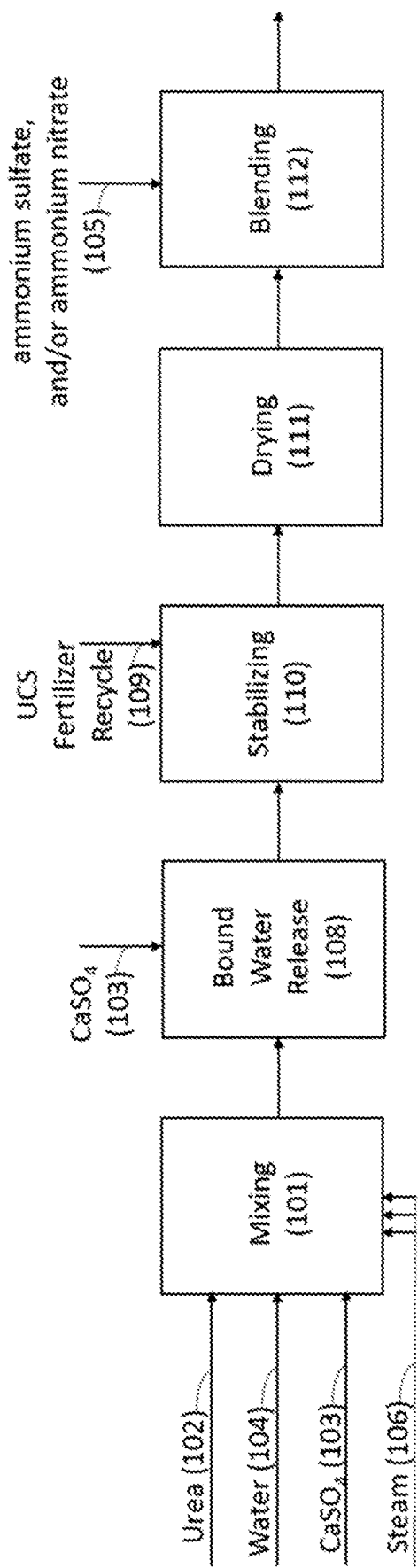

The UCS-based fertilizer of the present invention can be made using a system shown in FIG. 1A, FIG. 1B, or FIG. 1C, or a combination thereof. The system can be a continuous process capable of handling slurries or a process capable of blending solid fertilizers. The system can include a mixing zone (mixing) (101). The mixing zone (101) can include a mixing unit. The mixing unit can be a continuous stirred-tank reactor. In the mixing zone (101), urea (102) (e.g., fresh urea prills) (FIG. 1A), calcium sulfate (103) (e.g., gypsum), and water (104) can be combined in a mixing unit (e.g., a continuous stirred-tank reactor) to form an aqueous slurry. In some instances, urea free nitrogenous fertilizer (105), such as ammonium sulfate and/or ammonium nitrate, are also combined in the mixing zone (101) (see FIGS. 1A and 1B). In some instances, the water content of the aqueous slurry is 12% to 20% by weight, 13% to 19% by weight, or 15% to 18% by weight. A high level of mixing (e.g., agitator rpm of greater than 200 rpm) can be used to promote formation of the UCS adduct to decrease the amount of heat required for the formation. Additionally or alternatively, urea solution (see, FIG. 1B) and/or urea melt can be used as the urea (102), and can be introduced to the mixing zone (101). Calcium sulfate in any form of hydration or non-hydration, (e.g., anhydrous calcium sulfate, calcium sulfate hemihydrate, and calcium sulfate dihydrate) can be used as the calcium sulfate (103). These calcium sulfates with varying degrees on hydration can then be converted to calcium sulfate dihydrate suitable for the UCS adduct formation. Additionally or alternatively, a calcium sulfate slurry (see, FIG. 1B) can be used as the calcium sulfate (103), and can be introduced to the mixing zone (101). Urea dissolution is an endothermic process. Optionally, the temperature of the mixing zone (101) can be increased to 1) increase the formation of the adduct, 2) decrease the amount of water needed, and/or 3) decrease the viscosity of the aqueous slurry. Heat can be provided by any means suitable or known. In some instances, steam (106) is used. The optional use of steam (106) can inhibit absorption of heat from the surroundings and hence lowering the temperature requirement in the mixing zone (101) without additional energy. With steam (106) injection, the urea (102) can be rapidly dissolved while the surrounding material is maintained at the high temperature, which can preferably be about 80° C. to 115° C. or any range or value therein. Without wishing to be bound by theory, it is believed that the urea (102) can be in solution (partially or fully solubilized) to exchange urea for water in the calcium sulfate composition so as to form the adduct. Additional active or inactive ingredients can be added to the aqueous slurry while in the mixing zone (101) or at any other time.

Alternatively, urea (102) can be dissolved in an aqueous solution, calcium sulfate (103) can be formed into a slurry, urea free nitrogenous fertilizer (105), such as ammonium sulfate and/or ammonium nitrate, can be formed into a solution or slurry, or any combination thereof can be performed before entry into the mixing zone (101) (premixing) (107) (FIG. 1B). Accordingly, all or part of the water (104) that enters the mixing zone (101) can enter in a urea solution, calcium sulfate slurry, and/or urea free nitrogenous fertilizer slurry or solution.

Also as an alternative, the aqueous slurry containing UCS produced in the mixing zone (101) can exit the mixing zone (101) and enter a second mixing zone (not shown) where additional active or inactive ingredients can be added to the aqueous slurry. In some embodiments, urea free nitrogenous fertilizer (105) is added in a second mixing zone. Urea free nitrogenous fertilizer (105) can be added to any one of the zones.

In some instances, the aqueous slurry exits the mixing zone (101) or second mixing zone and can enter a bound water release zone (bound water release) (108). In the bound water release zone (108), the aqueous slurry can be mixed with unreacted calcium sulfate (103), recycled UCS fertilizer of the present invention (UCS fertilizer recycle) (109), and/or urea (102). As the UCS adduct is produced, bound water within the calcium sulfate is released, further promoting the conversion to UCS adduct. The temperature of the bound water release zone (108) can be 80° C. to 115° C., preferably 80° C. to 95° C., or at least, equal to, or between any two of 80° C., 85° C., 90° C., and 95° C.

Though shown in the figures, the slurry can optionally exit the bound water release zone (108) and enter a stabilizing zone (stabilizing) (110) where mixing can be continued. In some embodiments, UCS fertilizer recycle (109) can be added to any one of the zones to help maintain consistency of the mixture. Additional active or inactive ingredients can be added to the slurry.

The conditions of the material exiting the stabilizing zone (110), bound water release zone (108), mixing zone (101), or second mixing zone can be a semi-wet granule, which can easily form "balls that compress with the hands." If the material is too dry, then granulation is decreased leading to smaller product fraction in the material exiting the drying zone (drying) (111). If the material is too "wet" (tending towards mud) then there is a risk that the UCS "mud" will stick to the surfaces of a dryer, leading to building up on the dryer surface. In some instances, the material can be formed into granules during or after exiting the stabilizing zone (110).

Drying the fertilizer can enable agglomeration to form solid granules and can also create crystal bridges to enable crystallization of the adduct. In some embodiments, the UCS-based fertilizer or UCS is formed into granules and dried or further dried in a drying zone (drying) (111) (FIGS. 1A-1C).

The material can enter a the drying zone (drying) (111), that can include a dryer (e.g., a rotating dryer), to reduce the amount of free water in the material (FIG. 1A-1C). The formation of granules can occur or continue during the drying of the material. Observations of the material entering and exiting the drying zone (111) confirmed that granulation and UCS adduct conversion continues within the dryer. The operating temperature of the dryer can also be used to adjust the temperature at which the UCS fertilizer recycle materials (109) re-enters the system. Continuous operation can be achieved with drying zone (111) exit temperatures (as measured by the exit gas) between 80° C. to 90° C., preferably 85° C. to 88° C. or any value or range therein. If the exit temperature rises above 90° C. to 95° C., the composition may melt creating a molten mass inside the drying zone (111).

The material can exit the drying zone (111) and optionally be combined with the urea free nitrogenous fertilizer (105) (FIG. 1C) in a blending zone (112). In some instances, this can be the first time that the urea free nitrogenous fertilizer (105) is combined with the UCS. The urea free nitrogenous fertilizer (105) can be in a dry form such as a granule particle, powder, etc. The combining of the urea free nitrogenous fertilizer (105) with the UCS as a blend can form a UCS-based fertilizer of the present invention.

C. Blended or Compounded Fertilizer Compositions

The UCS-based fertilizer of the present invention can also be or can be included in a blended or compounded fertilizer composition comprising the urea free nitrogenous fertilizer and/or other fertilizers, such as other fertilizer granules. The formation of the blended or compounded fertilizer can be achieved by blending the urea free nitrogenous fertilizer and optionally additional fertilizers with UCS, or UCS fertilizer granules. Additional fertilizers can be chosen based on the particular needs of certain types of soil, climate, or other growing conditions to maximize the efficacy of the UCS-based fertilizer in enhancing plant growth and crop yield. The other fertilizers can be granules of urea, single super phosphate (SSP), triple super phosphate (TSP), ammonium sulfate, monoammonium phosphate (MAP), diammonium phosphate (DAP), muriate of potash (MOP), and/or sulfate of potash (SOP), and the like.

D. Method of Using the UCS-Based Fertilizer

The UCS-based fertilizer of the present invention can be used in methods of increasing the amount of nitrogen, sulfur, and/or calcium in soil and of enhancing plant growth. Such methods can include applying to the soil an effective amount of a composition comprising the UCS-based fertilizer of the present invention. The method may include increasing the growth and yield of crops, trees, ornamentals, etc. such as, for example, palm, coconut, rice, wheat, corn, barley, oats, and soybeans. The method can include applying UCS-based fertilizer of the present invention to at least one of a soil, an organism, a liquid carrier, a liquid solvent, etc.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bombacaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

The effectiveness of compositions comprising the UCS-based fertilizer of the present invention can be ascertained by measuring the amount of nutrients provided by the UCS-based fertilizer, such as nitrogen, sulfur, and/or calcium, in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by doing a side-by-side comparison in the same soil under the same conditions.

As discussed above, one of the unique aspects of the UCS-based fertilizers of the present invention is that they can have a density that is greater than water. This can allow the fertilizers to sink in water rather than float in water. This can be especially beneficial in instances where application is intended for a crop that is at least partially or fully submerged in water. A non-limiting example of such a crop is rice, as the ground in a rice paddy is typically submerged in water. Thus, application of UCS-based fertilizers to such crops can be performed such that the fertilizers are homogenously distributed on the ground that is submerged under water. By comparison, fertilizers that have a density that is less than water would have a tendency to remain in or on the water surface, which could result in washing away of the fertilizers and/or coalescence of fertilizer granules, either of which would not achieve homogenous distribution of the fertilizers to the ground that is submerged under water.

E. Compositions

The UCS-based fertilizers can be used alone or in combination with other fertilizer actives and micronutrients. The other fertilizer actives and micronutrients can be added with urea and calcium sulfate at the beginning of a granulation process, or a mixing or blending process, or at any later stage.

Non-limiting examples of additional additives can be micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients may include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients may include lime, gypsum, superphosphate, or a combination thereof. For example, in some instances the UCS-based fertilizer can contain calcium sulfate, potassium sulfate, magnesium sulfate, or a combination thereof.

In one aspect, the UCS-based fertilizer can comprise one or more inhibitors. The inhibitor can be a urease inhibitor or a nitrification inhibitor, or a combination thereof. In one aspect, UCS-based fertilizer can comprise a urease inhibitor and a nitrification inhibitor. In one aspect, the inhibitor can be a urease inhibitor. Suitable urease inhibitors include, but are not limited to, N-(n-butyl) thiophosphoric triamide (NBTPT) and phenylphosphorodiamidate (PPDA). In one aspect, the UCS-based fertilizer can comprise NBTPT or PPDA, or a combination thereof. In another aspect, the inhibitor can be a nitrification inhibitor. Suitable nitrification inhibitors include, but are not limited to, 3,4-dimethylpyrazole phosphate (DMPP), dicyandiamide (DCD), thiourea (TU), 2-chloro-6-(trichloromethyl)-pyridine (Nitrapyrin), 5-ethoxy-3-trichloromethyl-1,2,4-thiadiazol, which is sold under the tradename Terrazole®, by OHP Inc., USA, 2-amino 4-chloro 6-methyl pyrimidine (AM), 2-mercaptobenzothiazole (MBT), or 2-sulfanilamidothiazole (ST), and any combination thereof. In one aspect, nitrification inhibitor can comprise DMPP, DCD, TU, nitrapyrin, 5-ethoxy-3-trichloromethyl-1,2,4-thiadiazol, AM, MBT or ST, or a combination thereof. In one aspect, the UCS-based fertilizer can comprise NBTPT, DMPP, TU, DCD, PPDA, nitrapyrin, 5-ethoxy-3-trichloromethyl-1,2,4-thiadiazol, AM, MBT, or ST or a combination thereof.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

(Lab Scale Process to Prepare UCS-Based Fertilizer with Ammonium Sulfate)

A lab scale process for making a UCS-based fertilizer containing ammonium sulfate as the urea free nitrogenous fertilizer was performed by using the system described in FIGS. 1A-1B and in Section A of the Detailed Description of the Invention.

Urea, gypsum ($CaSO_4 \cdot 2H_2O$), and ammonium sulfate were added to water (1 to 20 wt. % water). The urea starting material had a nitrogen content of about 46 wt. %, ammonium sulfate starting material had a nitrogen content of about 21.5 wt. % and sulfur content of about 24 wt. %, and gypsum starting material had a calcium content of about 24 wt. % and sulfur content of about 17 wt. %. The aqueous mixture was heated to 60° C. to 115° C. and stirred constantly for 1 to 15 minutes. Repeat sample preparation at different reaction temperatures (e.g., 80° C., 90° C., 100° C., 110° C.) and different stirring (resident) times (e.g., 10 and 15 minutes) were tested. The reactions used prilled urea, grinded urea, melt urea, and 70 wt. % urea solution, or combinations thereof. The product was dried by oven or by leaving out for exposure to the ambient atmosphere. The product can be ground to produce a powder, or granulated to produce a granule.

A product containing 24 wt. % nitrogen, 10 wt. % sulfur, and 10 wt. % calcium was produced by using the following mixing ratios: 45 wt. % urea, 13 wt. % ammonium sulfate, and 42 wt. % gypsum. The nitrogen content of the UCS-based fertilizer was found to be 20.7 wt. % uric ($NH_2$) and 2.8 wt. % ammoniacal ($NH_3$) based on the total weight of the UCS-based fertilizer. The degree of conversion for forming the UCS adduct was between 82% to 88%. The preferred amount of water was 15 to 18 wt. % water, the preferred mixer/reactor temperature was between 80 and 90° C., and the preferred time for mixing was 10 to 15 minutes.

Example 2

(Lab Scale Process to Prepare UCS-Based Fertilizer with Ammonium Nitrate)

A lab scale process for making a UCS-based fertilizer containing ammonium nitrate as the urea free nitrogenous fertilizer was performed by using the system described in FIGS. 1A-1B and in Section A of the Detailed Description of the Invention.

Urea, gypsum ($CaSO_4 \cdot 2H_2O$), and ammonium nitrate were added to water (1 to 20 wt. % water). The urea starting material had a nitrogen content of about 46 wt. %, ammonium nitrate starting material had a nitrogen content of about 34.5 wt. %, and gypsum starting material had a calcium content of about 24 wt. % and sulfur content of about 17 wt. %. The aqueous mixture was heated to 60° C. to 115° C. and stirred constantly for 1 to 15 minutes. Repeat sample preparation at different reaction temperatures (e.g., 80° C., 90° C., 100° C., 110° C.) and different stirring (resident) times (e.g., 10 and 15 minutes) were tested. The reactions used prilled urea, grinded urea, melt urea, and 70 wt. % urea solution, or combinations thereof. The product was dried by oven or by leaving out for exposure to the ambient atmosphere. The product can be ground to produce a powder, or granulated to produce a granule.

A product containing 25 wt. % nitrogen, 7 wt. % sulfur, and 10 wt. % calcium was produced by using the following mixing ratios: 45 wt. % urea, 13 wt. % ammonium nitrate, and 42 wt. % gypsum. The nitrogen content of the UCS-based fertilizer was found to be 20.7 wt. % uric ($NH_2$) and 4.5 wt. % nitrate ($NO_3$) based on the total weight of the UCS-based fertilizer. The degree of conversion for forming the UCS adduct was between 80% to 85%. The preferred amount of water was 15 to 18 wt. % water, the preferred mixer/reactor temperature was between 80 and 90° C., and the preferred time for mixing was 10 to 15 minutes.

Example 3

(Compatibility)

The stable UCS-based fertilizers of the present invention contain higher amounts of elemental nitrogen, nitrate nitrogen, ammoniacal nitrogen, and/or elemental sulfur than other UCS adduct containing fertilizers. These higher amounts as well as the increased stability over urea and decreased production costs make the UCS-based fertilizer of the present invention an attractive fertilizer product alone and in blended or compounded fertilizers. It is expected that the UCS-based fertilizers are compatible with a wide range of typical fertilizer raw materials such as DAP, MAP, urea, MOP, and SOP and is more compatible than urea. Accordingly, the UCS-based fertilizers can be used to provide a range of nitrogen-phosphorus-sulfur (NPS), nitrogen-sulfur (NS), nitrogen-potassium-sulfur (NKS), and nitrogen-phosphorous-potassium (NPK) grades.

The invention claimed is:

1. A fertilizer composition comprising a calcium sulfate urea adduct and a urea free nitrogenous fertilizer, wherein the composition comprises 23 wt. % to 26 wt. % elemental nitrogen, 9 wt. % to 11 wt. % elemental calcium, and 6 wt. % to 11 wt. % elemental sulfur, and wherein at least 50 wt. % of urea in the composition is comprised in the calcium sulfate urea adduct.

2. The fertilizer composition of claim 1, wherein the urea free nitrogenous fertilizer comprises ammonium sulfate.

3. The fertilizer composition of claim 1, wherein the urea free nitrogenous fertilizer comprises ammonium nitrate.

4. The fertilizer composition of claim 1, comprising 2 wt. % to 7 wt. % elemental nitrogen in nitrate form ($NO_3$).

5. The fertilizer composition of claim 1, comprising 1 wt. % to 5 wt. % elemental nitrogen in ammoniacal form ($NH_3$).

6. The fertilizer composition of claim 1, further comprising one or more of iron, manganese, zinc, and copper.

7. The fertilizer composition of claim 1, comprising particles of the calcium sulfate urea adduct and particles of the urea free nitrogenous fertilizer.

8. The fertilizer composition of claim 1, comprising 15 wt. % to 25 wt. % elemental nitrogen in uric form ($NH_2$).

9. The fertilizer composition of claim 1, comprising 1 wt. % to 5 wt. % elemental nitrogen in ammoniacal form ($NH_3$) and 2 wt. % to 7 wt. % elemental nitrogen in nitrate form ($NO_3$).

10. The fertilizer composition of claim 1, wherein the composition is a fertilizer blend or a compounded fertilizer.

11. The fertilizer composition of claim 1, further comprising a phosphate-based fertilizer, a urea-based fertilizer, or a potassium-based fertilizer.

12. The fertilizer composition of claim 1, further comprising a micronutrient, a secondary nutrient, an organic additive, or any combination thereof.

13. A method of making the fertilizer composition of claim 1, the method comprising:
   (a) forming and/or obtaining a calcium sulfate urea adduct and combining the formed and/or obtained adduct with a urea free nitrogenous fertilizer to obtain the fertilizer composition; or
   (b) forming a calcium sulfate urea adduct from a mixture comprising urea, $CaSO_4$, water, and a urea free nitrogenous fertilizer to obtain the fertilizer composition.

14. The method of claim 13, wherein forming the calcium sulfate urea adduct comprises reacting urea and $CaSO_4$ to form the adduct.

15. The method of claim 14, wherein the reaction is performed at a temperature of 60° C. to 115° C.

16. The method of claim 14, comprising reacting urea and $CaSO_4$ at a weight ratio of 2:1 to 1:2, and wherein the urea free nitrogenous fertilizer is present in the fertilizer composition at a weight ratio of 1:6 to 1:2 as compared to the total amount of urea in the fertilizer bound in the calcium sulfate urea adduct and unbound.

17. The method of claim 13, wherein the urea free nitrogenous fertilizer comprises ammonium sulfate.

18. The method of claim 13, wherein the urea free nitrogenous fertilizer comprises ammonium nitrate.

19. The method of claim 13, wherein the fertilizer composition is dried to form a solid fertilizer composition.

20. A method of fertilizing, the method comprising applying the fertilizer composition of claim 1 to a portion of a soil, a crop, or the soil and the crop.

* * * * *